United States Patent
Brabson et al.

[11] Patent Number: 6,108,710
[45] Date of Patent: Aug. 22, 2000

[54] METHOD AND APPARATUS FOR OPTIMIZING ROUTE GENERATION IN A CONNECTION ORIENTED NETWORK

[75] Inventors: Roy F. Brabson, Raleigh; John L. Klonowski, Hillsborough, both of N.C.

[73] Assignee: International Business Machine Corp., Armonk, N.Y.

[21] Appl. No.: 08/978,828

[22] Filed: Nov. 26, 1997

[51] Int. Cl.[7] .................................................. G06F 15/173
[52] U.S. Cl. ........................ 709/241; 709/240; 709/239; 709/238; 709/242
[58] Field of Search .................................. 709/238, 239, 709/240, 241, 242

[56] References Cited

U.S. PATENT DOCUMENTS

| | | | |
|---|---|---|---|
| 4,914,571 | 4/1990 | Baratz et al. | 364/242.5 |
| 4,987,536 | 1/1991 | Humblet | 709/241 |
| 5,241,682 | 8/1993 | Bryant et al. | 709/249 |
| 5,481,604 | 1/1996 | Minot | 379/221 |
| 5,596,719 | 1/1997 | Ramakrishnan et al. | 709/241 |
| 5,627,971 | 5/1997 | Miernik | 709/241 |
| 5,629,930 | 5/1997 | Beshai et al. | 370/238 |
| 5,682,479 | 10/1997 | Newhall et al. | 709/242 |

*Primary Examiner*—Dung C. Dinh
*Assistant Examiner*—Chuong Ho
*Attorney, Agent, or Firm*—Jerry W. Herndon

[57] ABSTRACT

The route calculated by the routing portion of a connection-oriented protocol between source and destination nodes is further optimized after it is initially calculated. A node X that is part of the calculated route receives or generates a connection setup request which contains the calculated route. In response to the setup request, node X examines the nodes in the calculated route to determine if node X knows of a direct link between itself and another node Y in the calculated route that is not adjacent to node X. If such a direct link is known by node X to node Y, then node X replaces that portion of the calculated route from node X to node Y with the known direct link in the connection setup request, and then forwards the connection setup request to the next node in the present calculated route, where the optimization algorithm may be performed again.

8 Claims, 1 Drawing Sheet

METHOD AND APPARATUS FOR OPTIMIZING ROUTE GENERATION IN A CONNECTION ORIENTED NETWORK

TECHNICAL FIELD

The invention relates to the field of networking in general and, in particular, to the optimization of connection oriented packet routing algorithms between nodes contained in separate networks, which separate networks are characterized by the fact that each one knows nothing about the topology (other than links to border nodes) of any of the other separate networks.

BACKGROUND OF THE INVENTION

Connection oriented protocols use a calculated route for data communication on a given session between source and destination nodes until that route is no longer usable or the session is terminated. All connection oriented networks operate in generally the same way to calculate a route between a source node and a destination node and that route is used to transmit all packets on the session in question until the session ends. All connection oriented networks also use generally the same technique to calculate the session route. If the source node does not know the destination node or the destination application, initially, when a session is to be setup, the source node broadcasts a locate inquiry packet into the network to locate the destination node or the node containing the desired application. As the inquiry packet propagates through the network, the route used in reaching its present location is inserted into the header of the packet. Eventually, when the destination node or application is reached, the route used to get there is in the packet header and a reply packet containing that route is transmitted back through the network to the source node using the reverse of the route that was used in getting to the destination node. When the source node receives the reply packet, it knows from the packet header the calculated route to the destination node. From this point, a number of variations are used in transmitting data packets to the destination node. However, in every case, the calculated route is used for all packets until the session is ended.

A problem arises in such networks when the route between source and destination nodes includes nodes in separate networks. For purposes here, separate networks are characterized by the fact that each network knows nothing about the topology of the other networks, other than the links that exist between border nodes of the networks. This fact leads to the calculation of routes that may be suboptimal in the sense that a calculated route may contain unnecessary hops between nodes of separate networks.

SUMMARY OF THE INVENTION

The invention allows the route calculated by the routing portion of a connection-oriented protocol between source and destination nodes to be further optimized after it is initially calculated. A node X that is part of the calculated route receives or generates a message which contains the calculated route. In response to the message, node X examines the nodes in the calculated route to determine if node X knows of a direct link between itself and another node Y in the calculated route that is not adjacent to node X. If such a direct link is known by node X to node Y, then node X replaces that portion of the calculated route from node X to node Y with the known direct link in the message, and then forwards the message to the next node in the present calculated route, where the optimization algorithm may be repeated again. In the preferred embodiment, after a route is calculated using conventional algorithms, then each node along the route examines the calculated route to determine if it knows of a shorter route to a node in the calculated route. If it does, it replaces that portion of the calculated route with its known shorter route. Preferably, this tailoring of the calculated route is performed during the transmission of the session setup packet to the destination node. The process begins with the source node which examines the calculated route beginning with the last node in the route and proceeding towards to the beginning of the calculated route. The source node determines the last node in the route and then consults its topology database to determine if it knows of a shorter route to the last node. If so, it replaces that portion of the calculated route between itself and the last node with its known shorter route. If it does not know of a shorter route to the last node, it determines the next to the last node in the calculated route and consults its topology for a shorter route to that node. If it knows of a shorter route, it replaces the portion of the calculated route between itself and the next to the last node with the shorter route. As long as no shorter route is found for a given node in the calculated route, this process continues until the source node reaches itself in the calculated route, at which time the setup packet is transmitted to the next node in the calculated route. If at some point a shorter route is found, the calculated route is modified as described above and the setup packet transmitted to the next node in the new route.

Preferably, each node along the route that receives the setup packet performs the same algorithm summarized above to further optimize the route if possible until the connection setup packet reaches the destination node. The destination node returns a reply to the connection setup packet to the source node indicating that the connection has been established; the reply packet is transmitted along the optimized route that appears in the packet header of the setup packet when it reaches the destination node. The optimized route to be used for the connection is contained in the reply packet and each node receiving the reply packet takes note of the final optimized route.

DETAILED DESCRIPTION

Figure 1:
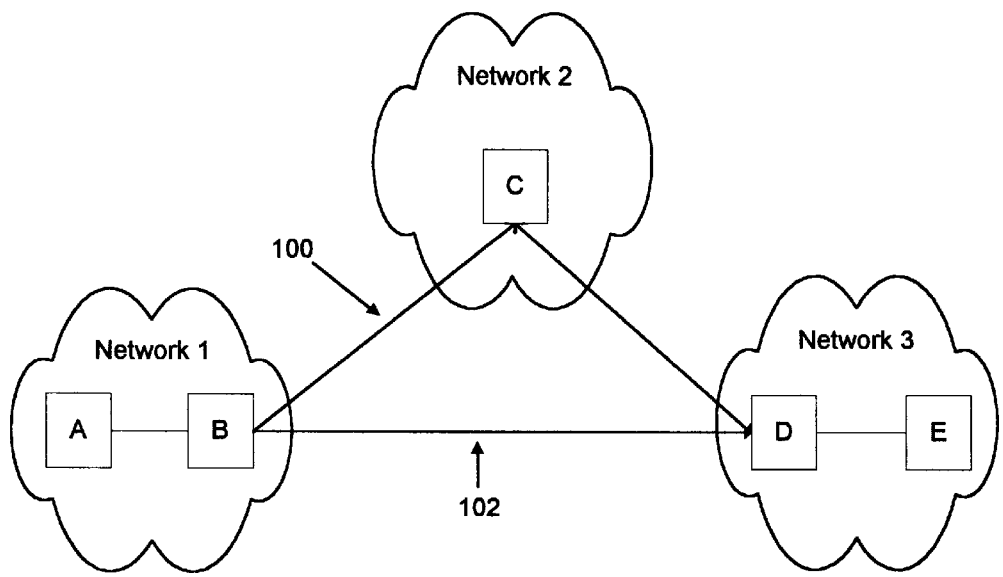
FIG. 1 shows an illustrative network which is used to describe the operation of the invention in detail.

FIG. 1 represents a simplified block diagram of an illustrative set of connected networks 1, 2 and 3. Network 1 consists of nodes A and B, Network 2 consists of node C and Network 3 consists of nodes D and E. Each of these networks are considered separate in the sense that each one, such as Network 1, does not know the topology of either of the other two. However, the border nodes of each network, that is the nodes of a network that have a link to another network, know of the existence and route to the corresponding border node in the connected network. For example, border node B in Network 1 knows that it is connected to node C via a link 100. However, node B knows no other details of Network C. Similarly, node B knows that it is connected to node D via link 102, but it does not know of the existence of node E. The following Table 1 shows all of the links and nodes of which each node of FIG. 1 is aware.

TABLE 1

| | |
|---|---|
| A | (A-B) |
| B | (A-B), (B-C), (B-D) |
| C | (B-C), (C-D) |
| D | (B-D), (C-D), (D-E) |
| E | (D-E) |

These nodes are shown connected in FIG. 1 in tandem purely for simplicity; any physical connectivity is possible within a given network.

Figure 2:
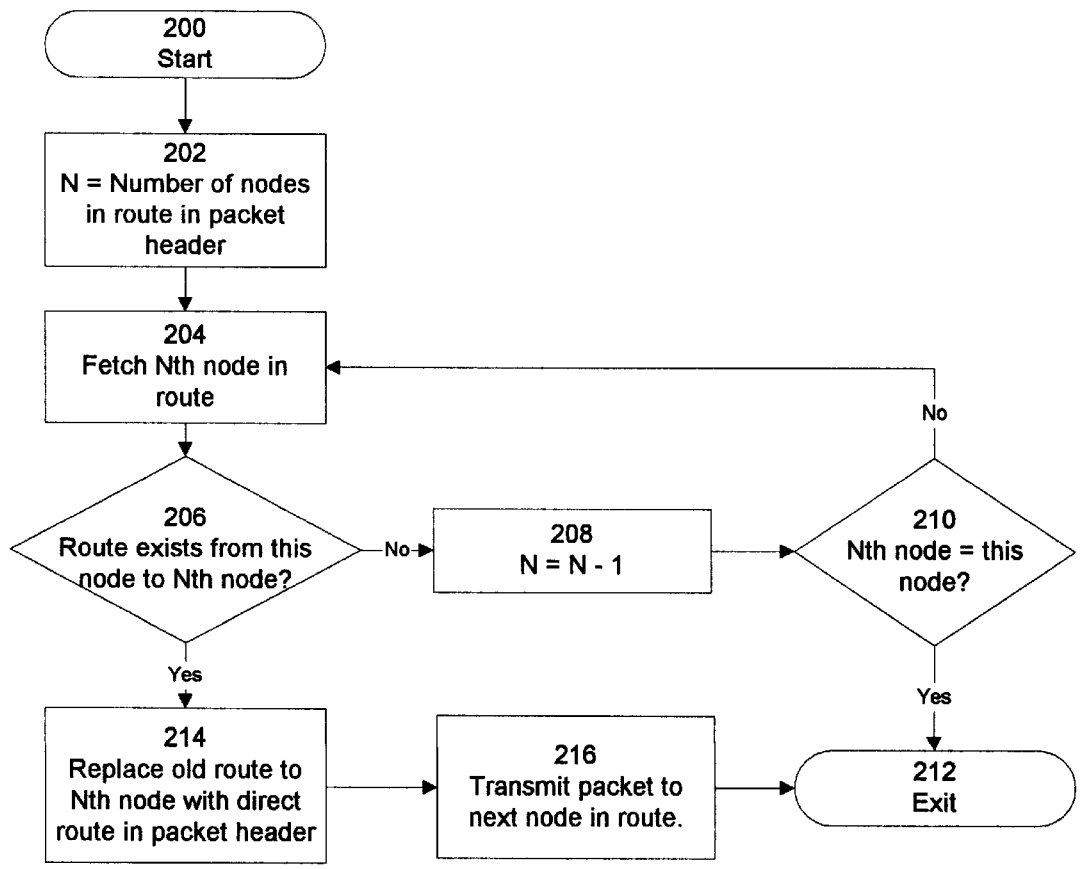
FIG. 2 shows an illustrative flowchart of the route optimization algorithm that is performed at each node receiving a connection setup packet.

The preferred embodiment of the invention resides in a network that utilizes IBM's APPN (Advanced Peer-to-Peer Networking) architecture and High Performance Routing (HPR) for transmitting data. In FIG. 2, each of the Networks 1, 2 and 3 can be considered to be separate APPN networks. An APPN network consists of network nodes which share a common network topology database, as well as all end nodes served by those network nodes. The APPN architecture is well known and publicly documented. It will be discussed here only to the extent necessary to provide an understanding of the invention in this environment. End nodes are typically workstations, printers or the like, but may contain more elaborate computing facilities, such as minicomputers or larger systems for processing data. A network node provides services for the end nodes attached to it and communicates with other network nodes. For example, a network node provides session establishment and routing services between itself and end nodes that it serves to other network and end nodes. Network nodes also provide directory services for the locating of resources in a network in response to requests to establish sessions with other network resources. An end node is always served by one network node. A network node and all end nodes served by that network node form a domain. One example of an APPN network which uses identified network node processors and other publicly known structure is IBM's AS/400 system. For simplicity, it is assumed that all nodes in FIG. 1 are network nodes.

A group of network nodes which share a common topology database, as well as all end nodes served by those network nodes, constitutes an APPN network. Within each network, each network node is aware of links between all nodes within the same network, as described above. Also as described above, each node is aware of links from itself to other networks. However, a node is not aware of links between other nodes in its network and nodes in other networks. The result is that each node in the network has an incomplete picture of the entire topology. Using FIG. 1 as an example, both node A and node B know about all links in Network 1, which in this case is only the (A-B) link. Since node A lacks any link to other networks, this is the only topology information known to node A. However, node B has two links to other networks, link 100 to Network 2 and link 102 to Network 3, and therefore is also aware of these links (B-C) and (B-D).

When an APPN network node wishes to establish a session with another node, the node initiates a LOCATE request which is transmitted throughout the network(s) and ultimately results in a REPLY message returned to the locating node. In SNA (System Network Architecture) terminology, the locating node is considered the primary node and is represented by a primary logical unit (PLU) identification. The desired node or a node containing the desired resource being searched for is deemed secondary and is represented by a secondary logical unit identification (SLU). The method by which a node or resource is located in an APPN network is described in U.S. Pat. No. 4,914,571, which was issued to Baratz et. al. Reference is made to this patent for a more complete understanding of the APPN locating process.

To establish a session, a route must be calculated from the node on which the PLU resides to the node on which the SLU resides. When the PLU and SLU reside in the same network, the entire route is calculated by the network node for the domain in which the PLU resides. Since the network node is aware of the complete topology in this case, it is able to calculate the entire route from the node on which the PLU resides to the node on which the SLU resides. When the PLU and SLU reside in different networks, no single node is aware of the entire topology. As a result, no single node can calculate the entire route. Instead, the route is calculated piecemeal, with a subset of the complete route calculated for each network. When all the routes are combined, the result is a complete route from the node on which the PLU resides to the node on which the SLU resides.

The route for each network is calculated during the processing of a LOCATE reply. For the network in which the PLU resides, the route for that network is calculated by the network node for the domain in which the PLU resides. For all other networks, the route is calculated by the network node at the network boundary prior to sending the LOCATE reply to the adjacent network. Each node which calculates a session route places that route in the LOCATE reply. If a route is already present, the existing route is removed from the LOCATE reply and the newly calculated route is combined with the route in LOCATE reply before placing the combined route in the LOCATE reply. This route defines the route through the current network all the way to the node on which the SLU resides. By the time the LOCATE reply reaches the node on which the PLU resides, the route in the LOCATE reply describes a complete path from the node on which the PLU resides to the node on which the SLU resides.

With respect to FIG. 1 as an illustrative example, a PLU on node A wishes to communicate with a SLU on node E. To establish a session from the PLU on node A to the SLU on node E, node A must first determine the location of node E. As part of its search algorithms, node A sends a LOCATE request to node B. In this example, node B has no record of where node E resides. Node B randomly decides to search Network 2 and the LOCATE request is forwarded to node C. If this LOCATE via Network 2 is unsuccessful, then node B eventually will initiate a LOCATE request via other links of which it is aware, such as link 102 to node D in this example. As with node B, node C has no record of where node E resides. Node C forwards the LOCATE request to the only other link that it is aware of, which is the link to node D in this example. Node D knows the location of node E via its topology database and forwards the LOCATE request to node E.

Node E processes the LOCATE request and returns a LOCATE reply along the same path taken by the LOCATE request. Since the PLU is not within node E's domain and node E is sending the LOCATE reply to node D which is within its network, node E does not calculate a path through Network 3 prior to sending the LOCATE reply to node D. Node D processes the LOCATE reply and prepares to send the reply to node C. Node C is in a different network than node D, so node D calculates a route for Network 3. Since the SLU is also in Network 3, the route calculated is from node D to the node on which the SLU resides, node E. Node D examines the LOCATE reply which it received from node E. Since no route is already present in the LOCATE reply, the route which node D calculated, (D-E), is placed in the LOCATE reply. The LOCATE reply is then sent to node C. Node C processes the LOCATE reply and prepares to send the reply to node B. Node B is in a different network than node C, so node C calculates a route for Network 2. The SLU does not reside within Network 2, so node C calculates a route, (C-D), to the first node in the adjacent network in the direction of the SLU. Node C examines the LOCATE reply which it received from node D. A route, (D-E), is already present in the LOCATE reply. Node C combines the route it calculated, (C-D), with the route already present in the LOCATE reply, (D-E), to create a combined route of (C-D-E). Node C replaces the existing route in the LOCATE reply with the combined route and returns the reply to node B. Node B processes the LOCATE reply but, since node B is sending the LOCATE reply to node A within its network and the PLU does not reside in the same domain as node B, node B does not modify the route information in the LOCATE reply. Node B sends the LOCATE reply to node A, which then processes the LOCATE reply. Since the PLU resides within the domain of node A, node A calculates a route for Network 1. Since the SLU resides in a different network, node A calculates a route, (A-B-C), from node A on which the PLU resides to the first node in another network on the path to the SLU. Node A then examines the LOCATE reply and finds an existing route, (C-D-E), in the reply. Node A combines the route for Network 1 (A-B-C) with the route in the LOCATE reply. The resulting route, (A-B-C-D-E), describes a complete route from the node on which the PLU resides to the node on which the SLU resides.

Once node A has the complete route, node A sends a ROUTE_SETUP request to inform all nodes along the route that it is getting ready to send data. Prior to the present invention, the ROUTE_SETUP request would contain the route (A-B-C-D-E) previously calculated. In accordance with the invention, before sending the ROUTE_SETUP packet to another node, the algorithm described in FIG. 2 is performed to further optimize the calculated route, if possible. Stated simply, node A examines each node in the calculated route, starting with the last node in the route and proceeds towards the first node in the route. For each node, the algorithm determines if the present node A knows of a direct link to the node presently being examined in the route. If it does, node A replaces the link or links in the calculated route from the present node A to the node being examined with the known direct link to that node. This same algorithm is repeated in each node along the optimized route as the ROUTE_SETUP packet is passed along to further optimize the route at each successive node, if possible.

With reference now to FIG. 2, Node A enters the optimization algorithm at START 200. Recall that the calculated route received in the reply packet at node A is A-B-C-D-E in the illustrative network of FIG. 1. Step 202 initializes a variable N to the number of nodes in the calculated route. In the present example, N is set to 5. Step 204 fetches the Nth node from the route, which is E in this example. Step 206 then searches the topology database of node A to determine if it knows of a direct link from node A to node E. In this case, node A knows of no such link. Therefore, step 208 decrements N by 1 (N=4) and step 210 determines if this new value of N points to the present node A in the calculated route. Since the new value of N, (4), points to node D in the calculated route, step 204 fetches the fourth entry (node D) from the calculated route and step 206 determines from nodes A's topology database if a link exists from node A to node D. Again, no such link is known and the above process repeats until all nodes up to node A in the calculated route have been processed. Since, in this illustrative example, no direct link is known by node A other than the link to node B, the algorithm eventually exhausts and the ROUTE_SETUP packet is eventually transmitted unchanged at step 216 to node B.

The algorithm of FIG. 2 is also repeated at node B. On the first pass through the algorithm, step 206 looks for a direct link between node B and node E, which does not exist. On the second pass, however, step 206 finds a direct link 102 between itself and node D. Therefore, step 214 replaces the calculated route from node B to node D in the ROUTE_SETUP packet with the direct link 102 to node D. The calculated route in the packet is now A-B-D-E. Step 216 transmits the ROUTE_SETUP packet containing the new route to the next node D in the new route where the algorithm of FIG. 2 is again processed. In this instance, step 214 replaces the link from node D to node E with the same link, which of course leaves the calculated route unchanged at this point. and step 216 passes the packet on to node E. At this point, node E becomes aware of the shortened calculated route of (A-B-D-E). As a result, node E sends a ROUTE_SETUP reply to node A along with this new route which is to be used. Subsequent data packets sent by node A to node E use the shortened route of A-B-D-E, while data packets sent by node E to node A will use the reverse route of E-D-B-A.

The preferred embodiment of this invention described above uses a source routing mechanism to transmit packets. With source routing, each packet sent into the network contains sufficient information to allow the packet to be routed to the destination. Intermediate nodes examine the routing information contained in the packet to determine where the packet should be sent.

There are, however, other methods which can be used to transmit data packets for a connection oriented protocol through a network. One approach is based on a label swapping mechanism. With label swapping, each node uses the combination of the connection over which a packet is received and the label contained in the packet to identify a given session. The session then identifies the next hop in the route as well as the label to be sent. The new label is substituted in the packet and the packet is sent of the connection.

Another approach is to use a single unique session identifier which is shared by all nodes along the route. When a packet is received, the session identifier is used to identify the session. The session then identifies the next hop in the route, and the packet is sent over the connection without modifying the session identifier.

While each of these approaches differs in the details of how the packet is routed through the network, they all rely on the same underlying mechanism to generate the route which will be taken and the invention is applicable to improve the routing operations used by these alternative connection oriented protocols in ways that will be apparent in view of the present teaching to any skilled art worker.

It is to be understood that the above described arrangements are merely illustrative of the application of principles of the invention and that other arrangements may be devised by workers skilled in the art without departing from the spirit and scope of the invention.

What is claimed:

1. A method performed at a node X of optimizing a calculated route between a source node and a destination node of a connection oriented network, said method comprising the steps executed at node X of receiving a message containing the calculated route from another node, examining the nodes in the calculated route to determine if node X knows of a direct link between itself and another node Y in the calculated route that is not adjacent to node X in the calculated route, if said direct link is known by node X to node Y, replacing that portion of the calculated route from node X to node Y with the known direct link in the message, and transmitting the message to the next node in the present calculated route.

2. A method of improving route generation at a node of a connection oriented network, in which the nodes forming a route between a source node and a destination node is initially precalculated, said method comprising the steps executed at a node X of receiving a connection setup request from another node, said setup request containing a calculated route between a source node and a destination node and including the present node X examining the nodes in the calculated route in sequence, from the destination node toward the present node X, to determine if node X knows of a direct link between itself and a node Y presently being examined, if a direct link is known by node X to node Y, replacing that portion of the calculated route from node X to node Y with the known direct link in the connection setup request, and transmitting the connection setup request to the next node in the present calculated route.

3. A method of improving route generation in a connection oriented network, in which a route consisting of nodes connecting a source node and a destination node is initially precalculated, said method comprising the steps of optimizing the calculated route at one or more of the nodes of the calculated route, said optimizing further comprising at each said one or more nodes of the calculated route in succession beginning with the source node and ending with the destination node, examining the nodes in the calculated route in sequence, from the destination node toward the source node, to determine if the node X performing the examination knows of a direct link between itself and the node Y presently being examined, if a direct link is known by node X to node Y, replacing that portion of the calculated route from node X to node Y with the known direct link, and transmitting the present calculated route to the next node in the present calculated route.

4. Apparatus located at a node X for optimizing a calculated route between a source node and a destination node of a connection oriented network, said apparatus comprising, means for receiving a message containing the calculated route from another node, means for determining if node X knows of a direct link between itself and another node Y in the calculated route that is not adjacent to node X in the calculated route, means for replacing that portion of the calculated route from node X to node Y with the known direct link in the message, and means for transmitting the message to the next node in the present calculated route.

5. Apparatus for improving route generation at a node X of a connection oriented network, in which the nodes forming a route between a source node and a destination node is initially precalculated, said apparatus comprising means for receiving a connection setup request from another node, said setup request containing a calculated route between a source node and a destination node and including the present node X means for determining if node X knows of a direct link between itself and a node Y in the precalculated route that is not adjacent to node X, means for replacing that portion of the calculated route from node X to node Y with the known direct link in the connection setup request, and means for transmitting the connection setup request to the next node in the present calculated route.

6. Apparatus for improving route generation in a connection oriented network, in which a route consisting of nodes connecting a source node and a destination node is initially precalculated, said apparatus comprising means at each node X of the calculated route for examining the nodes in the precalculated route in sequence, from the destination node toward node X, means responsive to the examining means for determining if a direct link exists between node X and a node Y presently being examined, means for replacing that portion of the calculated route from node X to node Y with the known direct link, and means for transmitting the present calculated route to the next node in the present calculated route.

7. A computer program product intended for loading and execution at a node X of a network for optimizing a calculated route between a source node and a destination node of a connection oriented network, the computer program product comprising a computer-readable medium having computer-readable program code means embodied in the medium, the computer-readable program code means comprising computer-readable program code means for receiving a connection setup request containing the calculated route, computer-readable program means for determining if node X knows of a direct link between itself and another node Y in the calculated route that is not adjacent to node X in the calculated route, computer-readable program means for replacing that portion of the calculated route from node X to node Y with the known direct link in the connection setup request, and computer-readable program means for transmitting the connection setup request to the next node in the present calculated route.

8. A computer program product intended for loading and execution at a node X of a network for optimizing a calculated route between a source node and a destination node of a connection oriented network, the computer program product comprising a computer-readable medium having computer-readable program code means embodied in the medium, the computer-readable program code means comprising computer-readable program code means for examining the nodes in the calculated route in sequence, from the destination node toward node X, computer-readable program code means responsive to the examining means for determining if a direct link exists between node X and a node Y presently being examined, computer-readable program code means for replacing that portion of the calculated route from node X to node Y with the known direct link, and computer-readable program code means for transmitting the present calculated route to the next node in the present calculated route.

* * * * *